(12) United States Patent
De Almeida et al.

(10) Patent No.: US 12,382,438 B2
(45) Date of Patent: Aug. 5, 2025

(54) SENDING DATA USING A PACKET-BASED INTERFACE (71) Applicant: Telefonaktiebolaget LM Ericsson (publ), Stockholm (SE)

(72) Inventors: Igor Mesquita De Almeida, Indaiatuba (BR); Andre Mendes Cavalcante, Indaiatuba (BR); Eduardo Lins De Medeiros, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 529 days.

(21) Appl. No.: 17/629,982

(22) PCT Filed: Jul. 29, 2019

(86) PCT No.: PCT/EP2019/070352
§ 371 (c)(1),
(2) Date: Jan. 25, 2022

(87) PCT Pub. No.: WO2021/018375
PCT Pub. Date: Feb. 4, 2021

(65) Prior Publication Data
US 2022/0256536 A1 Aug. 11, 2022

(51) Int. Cl.
*H04W 72/0446* (2023.01)
*H04L 1/1812* (2023.01)
(Continued)

(52) U.S. Cl.
CPC ....... *H04W 72/0446* (2013.01); *H04L 1/1812* (2013.01); *H04L 1/1864* (2013.01);
(Continued)

(58) Field of Classification Search
CPC .......... H04W 72/042; H04W 72/0446; H04W 72/0466; H04W 72/12; H04W 24/08;
(Continued)

(56) References Cited

U.S. PATENT DOCUMENTS

2016/0191174 A1* 6/2016 Hwang .................. H04B 15/00
375/348
2017/0373890 A1* 12/2017 Fertonani ............ H04L 27/2634
(Continued)

FOREIGN PATENT DOCUMENTS

| WO | 2020151800 A1 | 7/2020 |
| WO | 2020151802 A1 | 7/2020 |

OTHER PUBLICATIONS

International Search Report and Written Opinion dated Apr. 6, 2020 for International Application No. PCT/EP2019/070352 file Jul. 29, 2019, consisting of 10-pages.
(Continued)

*Primary Examiner* — Huy D Vu
*Assistant Examiner* — Scott A Schlack
(74) *Attorney, Agent, or Firm* — Weisberg I.P. Law, P.A.

(57) ABSTRACT

Methods and apparatus are provided for sending data using a packet-based interface to cause a radio unit to send transmissions to at least one UE. In an example aspect, a method includes determining that a packet for causing the radio unit to send transmissions to a first user equipment, UE, in at least a portion of a time interval allocated to the first UE for transmissions to the first UE will not reach the radio unit, and sending at least one further packet to the radio unit to cause the radio unit to send transmissions to a second UE in at least part of the time interval.

19 Claims, 3 Drawing Sheets

(51) Int. Cl.
*H04L 1/1829* (2023.01)
*H04L 5/00* (2006.01)
*H04W 72/02* (2009.01)
*H04W 72/04* (2023.01)
*H04W 72/12* (2023.01)
*H04W 72/20* (2023.01)
*H04W 72/23* (2023.01)
*H04W 72/29* (2023.01)

(52) U.S. Cl.
CPC ........... *H04L 5/0037* (2013.01); *H04W 72/02* (2013.01); *H04W 72/04* (2013.01); *H04W 72/12* (2013.01); *H04W 72/20* (2023.01); *H04W 72/23* (2023.01); *H04W 72/29* (2023.01); *H04L 5/0078* (2013.01)

(58) Field of Classification Search
CPC . H04W 24/10; H04W 52/0206; H04W 52/34; H04L 47/12; H04L 47/31; H04L 65/403; H04L 65/605; H04L 65/608; H04L 5/0005; H04L 5/0037; H04L 5/0048; H04L 5/1407; H04L 1/0058; H04L 1/1812; H04L 1/1861; H04L 1/1864
See application file for complete search history.

(56) References Cited

U.S. PATENT DOCUMENTS

| | | | | |
|---|---|---|---|---|
| 2018/0234359 A1* | 8/2018 | Hosseini | ............... | H04L 1/1861 |
| 2018/0278368 A1* | 9/2018 | Kim | ..................... | H04L 1/0048 |
| 2018/0288781 A1* | 10/2018 | Akkarakaran | .... | H04W 72/0446 |
| 2018/0324237 A1* | 11/2018 | Johansson | ............... | H04L 47/12 |
| 2019/0253232 A1* | 8/2019 | Park | ..................... | H04L 5/1407 |
| 2020/0389806 A1* | 12/2020 | Charipadi | ............. | H04W 24/10 |

OTHER PUBLICATIONS

ECPRI Specification V1.1; Common Public Radio Interface: eCPRI Interface Specification; Jan. 10, 2018, consisting of 62-pages.
XRAN Fronthaul Working Group Control, User and Synchronization Plane Specification; XRAN-FH.CUS.0-v01.00 Technical Specification; RAN; 2018, consisting of 61-pages.
3GPP TS 38.212 V15.5.0; 3rd Generation Partnership Project; Technical Specification Group Radio Access Network; NR; Multiplexing and channel coding (Release 15), Mar. 2019, consisting of 101-pages.
Erik Dahlman et al.; 5G NR the Next Generation Wireless Access Technology; Academic Press; 2018, consisting of 24-pages.
Mahmoud Bahnasy et al.; Proactive Ethernet Congestion Control Based on Link utilization Estimation; 2016 International Conference on Computing, Networking and Communications (ICNC), Workshop on Computing, Networking and Communications (CNC); 2016, consisting of 6-pages.
Ahmed Nasrallah et al.; Ultra-Low Latency (ULL) Networks: The IEEE TSN and IETF DetNet Standards and Related 5G ULL Research; IEEE Communications Surveys & Tutorials, Sep. 7, 2018, consisting of 59-pages.
Chia-Yu Chang et al.; Impact of Packetization and Scheduling on C-RAN Fronthaul Performance; 2016 IEEE Global Communications Conference (GLOBECOM); Dec. 4, 2016, consisting of 7-pages.
3GPP TS 38.214 V15.5.0; 3rd Generation Partnership Project; Technical Specification Group Radio Access Network; NR; Physical layer procedures for data (Release 15), Mar. 2019, consisting of 103-pages.

* cited by examiner

SENDING DATA USING A PACKET-BASED INTERFACE

CROSS-REFERENCE TO RELATED APPLICATION

This application is a Submission Under 35 U.S.C. § 371 for U.S. National Stage Patent Application of International Application Number: PCT/EP2019/070352, filed Jul. 29, 2019 entitled "SENDING DATA USING A PACKET-BASED INTERFACE," the entirety of which is incorporated herein by reference.

TECHNICAL FIELD

Examples of the present disclosure relate to sending data using a packet-based interface, for example to cause a radio unit to send transmissions to at least one UE.

BACKGROUND

In certain communications networks, such as for example 5G networks, connections between baseband processing nodes and radio nodes, called fronthaul (FH) connections, may be packet-based, carrying time-sensitive data. Utilization of fronthaul communication links may fluctuate with the number of user equipments (UEs) being served. Additionally, fronthaul links may be shared between multiple baseband processing nodes and/or radio nodes. This can lead to unacceptable queueing (due to excessive traffic that may need to be transmitted simultaneously) or packet losses that have detrimental effect on radio performance.

Figure 1:
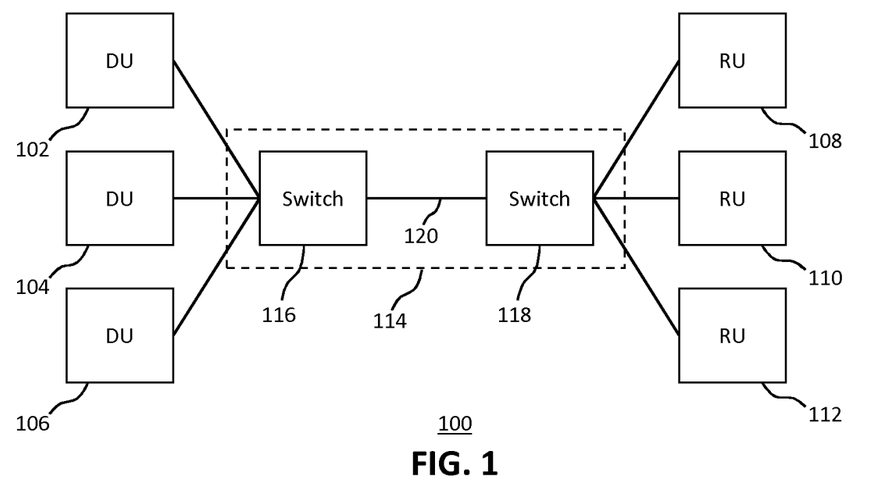
FIG. 1 is a schematic of an example of a communications network.

FIG. 1 is a schematic of an example of a communications network 100, such as for example a 5G network. The network 100 may also include other nodes (not shown). The network 100 includes three baseband processing units 102, 104 and 106 (also called digital units, DUs), and three radio units (RUs) 108, 110 and 112. In other examples, the network may include any number of (one or more) DUs and any number of (one or more) RUs. The DUs and RUs may be connected via a packet-based fronthaul network 114 that includes a first switch 116 and a second switch 118 connected by a fronthaul link 120. The network 100 may suffer from the queueing and packet loss problems illustrated above.

A fronthaul manager, such as for example a node or a packet processing function within a node, may be responsible among other things for determining packet priorities, managing queue sizes, and marking and/or dropping packets. It is aware of, or can estimate, available instantaneous capacity in the fronthaul network. It may also consider the fronthaul network's state when deciding what should be done with fronthaul data. One such decision may be to drop data (e.g. one or more fronthaul packets) due to, for example, limited fronthaul capacity. When this happens, data such as for example in a physical downlink shared channel (PDSCH) never reaches the UE, because it is never sent to the radio unit or is dropped by an intermediate network node. This in turn may trigger a hybrid automatic repeat request negative acknowledgement (HARQ NACK) from the UE, particularly if other transmissions have insufficient redundancy to compensate for the dropped data. Thus, there may be a loss of efficiency in the air interface.

SUMMARY

One aspect of the present disclosure provides a method of sending data using a packet-based interface to cause a radio unit to send transmissions to at least one UE. The method comprises determining that a packet for causing the radio unit to send transmissions to a first user equipment, UE, in at least a portion of a time interval allocated to the first UE for transmissions to the first UE will not reach the radio unit. The method also comprises sending at least one further packet to the radio unit to cause the radio unit to send transmissions to a second UE in at least part of the time interval.

A further aspect of the present disclosure provides apparatus for sending data using a packet-based interface to cause a radio unit to send transmissions to at least one UE. The apparatus comprises a processor and a memory. The memory contains instructions executable by the processor such that the apparatus is operable to determine that a packet for causing the radio unit to send transmissions to a first user equipment, UE, in at least a portion of a time interval allocated to the first UE for transmissions to the first UE will not reach the radio unit, and send at least one further packet to the radio unit to cause the radio unit to send transmissions to a second UE in at least part of the time interval.

An additional aspect of the present disclosure provides apparatus for sending data using a packet-based interface to cause a radio unit to send transmissions to at least one UE. The apparatus is configured to determine that a packet for causing the radio unit to send transmissions to a first user equipment, UE, in at least a portion of a time interval allocated to the first UE for transmissions to the first UE will not reach the radio unit, and send at least one further packet to the radio unit to cause the radio unit to send transmissions to a second UE in at least part of the time interval.

Yet another aspect of the present disclosure provides a network comprising an apparatus for sending data using a packet-based interface to cause a radio unit to send transmissions to at least one UE. The apparatus in the network, comprises a processor and a memory. The memory contains instructions executable by the processor such that the apparatus is operable to determine that a packet for causing the radio unit to send transmissions to a first user equipment, UE, in at least a portion of a time interval allocated to the first UE for transmissions to the first UE will not reach the radio unit. Further the apparatus is operable to send at least one further packet to the radio unit to cause the radio unit to send transmissions to a second UE in at least part of the time interval.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general-purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

One way to avoid the loss of efficiency of the air interface as described above is to limit the fronthaul load available to nodes to a fraction of its full capacity. This could be implemented for example with "negotiation rounds" between the radio scheduler (e.g. in a baseband processing node or digital unit) and a fronthaul manager. The scheduler (or a group of schedulers) could submit scheduling proposals to a fronthaul manager or fronthaul coordinating entity and receive feedback, such that the decisions could be modified until a feasible set of allocations is reached. This incurs additional latency between the base station and the UE, and timing requirements (e.g. for LTE or New Radio, NR/5G traffic) may not be respected.

An alternative solution may be to introduce a fixed limitation on the amount of traffic a scheduler can schedule, in such a way that all nodes sharing fronthaul links will not exceed the fronthaul capacity. This scheme is suboptimal since it does not take into account dynamics of the air interface, number of UEs in each cell and other parameters. Therefore, it may result in under-utilization of fronthaul resources and cell capacity.

Embodiments of this disclosure include methods in which the radio scheduler (e.g. baseband processing unit or digital unit) is made aware that data may not reach a radio unit and cause the radio unit to make a transmission to at least one User Equipment (UE). This may be due to for example a packet drop by a fronthaul manager or switch. The radio scheduler may then employ actions to mitigate the efficiency loss in the air interface. These actions may involve, for example, (a) notifying the affected UE(s); (b) scheduling transmissions to utilize some of the lost transmission opportunities; and/or (c) configuring itself in preparation for the (expected) response from the affected UE(s), such as for example one or more HARQ NACKs.

Figure 2:
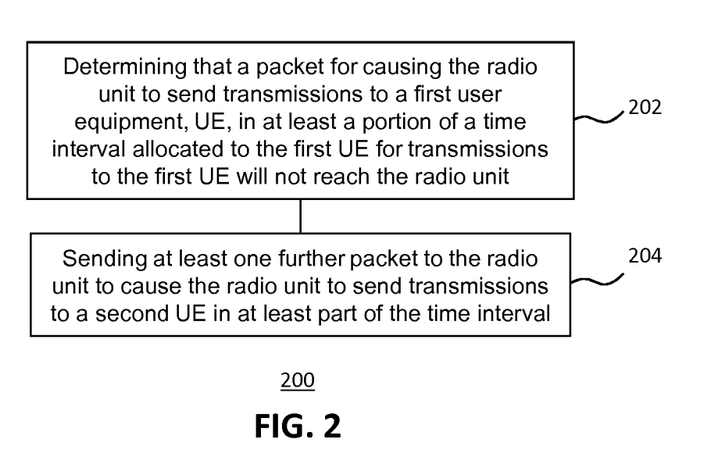
FIG. 2 is a flow chart of an example of a method of sending data using a packet-based interface to cause a radio unit to send transmissions to at least one UE.

FIG. 2 is a flow chart of an example of a method 200 of sending data using a packet-based interface to cause a radio unit to send transmissions to at least one UE. The method 200 may be performed in some examples by a radio scheduler, baseband processing unit, baseband processing network function, radio equipment controller, eCPRI radio equipment controller, distributed unit or digital unit. In some examples, the interface may comprise a common public radio interface, CPRI, or enhanced common public radio interface, eCPRI, and/or the data sent over the interface may include for example CPRI or eCPRI data.

The method 200 comprises, in step 202, determining that a packet for causing the radio unit to send transmissions to a first user equipment, UE, in at least a portion of a time interval allocated to the first UE (e.g. a plurality of resource blocks allocated to the first UE) for transmissions to the first UE will not reach the radio unit. This may be due to, for example, the packet being dropped. Determining that the packet will not reach the radio unit may in some examples comprise receiving a notification from a controller of the packet based-interface or switch of the packet-based interface that the packet will not reach the radio unit (e.g. because the packet has been or will be dropped). In some examples, the notification identifies the packet and/or the at least a portion of the time interval, for example using a sequence number, MACsec packet number (Media Access Control Security defined in IEEE 802.1AE standard), time stamp and/or frame check sequence.

The method 200 also comprises, in step 204, sending at least one further packet to the radio unit (e.g. using the packet-based interface) to cause the radio unit to send transmissions to a second UE in at least part of the time interval (e.g. using at least some of the resource blocks allocated to the first UE).

Figure 3:
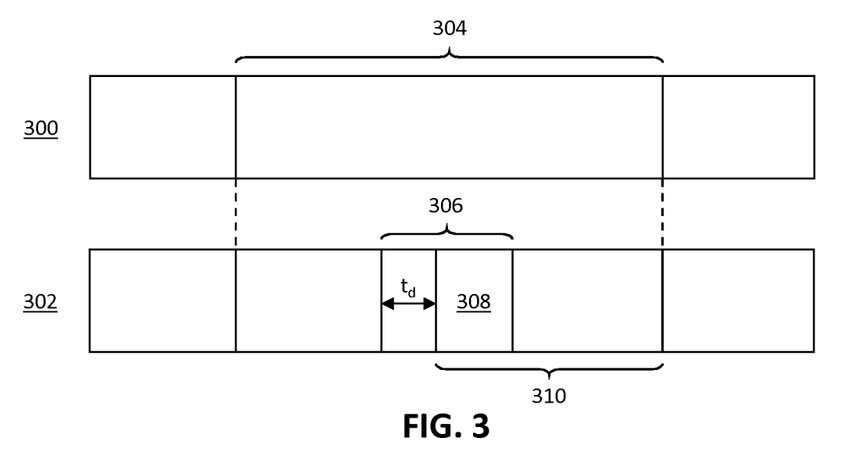
FIG. 3 shows an example of timings for scheduled transmissions and actual transmissions in a communications network.

FIG. 3 shows an example of timings for scheduled transmissions and actual transmissions in a communications network. FIG. 3 shows scheduled transmissions 300, for example that were scheduled before step 202 of FIG. 2, i.e. before a node such as a scheduler has determined that a packet will not reach a radio unit. The horizontal axis represents time. Also shown are actual transmissions, e.g. as a result of steps 202 and 204 of the method 200. As shown in FIG. 3, a time interval 304 is allocated for transmissions to a first UE (in some examples, the time interval 304 may comprise one or more time slots). However, the scheduler may determine (e.g. be informed) that a fronthaul packet may not reach the radio interface. As a result, transmissions to the first UE scheduled for a portion 306 of the time interval will not be transmitted to the first UE. The scheduler may determine that the fronthaul packet may not reach the radio interface at any appropriate time, such as for example during the time interval 304, before the time period 306, at the start of the time portion 306, or even during the first part of the time portion 306 (e.g. during time $t_d$).

Due to the time-sensitive nature of fronthaul communications, it may not be possible to send a replacement packet to the radio unit to cause the radio unit to make the dropped transmissions to the first UE in the portion 306 of the time interval. However, there may be sufficient time to send one or more packets to the radio unit to cause the radio unit to send transmissions to a second UE in at least part of the time interval 304. For example, transmissions may be sent to the second UE in a part 308 of the portion 306 of the time interval 304. Due to timing constraints, it may not be possible to cause the radio unit to send transmissions to the second UE for all of the portion 306 of the time interval, though if data is sent to the radio unit quickly enough, e.g. within a time period $t_d$ shown in FIG. 3, transmissions may be sent to the second UE in a remaining portion 308 of the portion 306 following the time period $t_d$. In some examples, transmissions may also be sent to the second UE also during the remainder of the time interval 304 that was originally allocated for transmissions only to the first UE. This may be useful for example in embodiments where a HARQ NACK is expected from the first UE corresponding to the entire time interval 304, due to the dropped transmissions in the portion 306 of the time interval. In such cases, it may not be useful to transmit to the first UE in the time interval following the portion 306 as it may be assumed that the first UE will reject (due to the NACK) the transmissions for the whole of the time interval 304.

In some examples, which may include receiving a notification from a controller of the packet based-interface or switch of the packet-based interface that the packet will not reach the radio unit, the controller or switch may be co-located with an entity performing the method. For example, the controller or switch may be within the same apparatus as the entity (which is for example a scheduler), or may be in adjacent or nearby apparatus. As a result, for example, the notification may be provided to the entity quickly. If the entity performing the method 200 is informed quickly, for example, then the further packet(s) may be sent to the radio unit more quickly. As a result, more of the portion 306 of the time interval 304 may be utilized for transmissions to the second UE, which may result in lower degradation of efficiency of the air interface.

In some examples, sending the at least one further packet to the radio unit to cause the radio unit to send transmissions to the second UE in at least part of the time interval comprises sending the at least one further packet to the radio unit to cause the radio unit to send transmissions to the second UE in at least a sub-portion of the portion of the time interval. The sub-portion may comprise for example the part 308 of the portion 306 of the time interval, as shown in FIG. 3.

Subsequent to the transmissions sent to the first UE and the second UE, the method may comprise receiving a hybrid automatic repeat request acknowledgement, HARQ ACK, or negative acknowledgement, NACK, associated with the at least part of the time interval from the second UE and a HARQ NACK associated with the at least a portion of the time interval from the first UE. The HARQ NACK may be expected from the first UE because of the disruption to the transmissions to the UE in the portion 308 of the time interval. In some examples, the HARQ ACK or NACK from the second UE and the HARQ NACK from the first UE are received simultaneously. As a result, the NACK from the first UE may interfere with the HARQ response from the second UE. However, in some examples, the knowledge that the response from the first UE will be a NACK may be used to improve reception of the HARQ response from the second UE, for example using interference cancellation techniques.

The transmissions to the first UE in the at least a portion of a time interval may in some examples comprise physical downlink shared channel, PDSCH, transmissions. Additionally or alternatively, in some examples, the transmissions to the second UE in the at least part of the time interval comprise PDSCH transmissions. However, in other examples the transmissions to either UE may comprise other types of transmissions.

In some examples, the method 200 may comprise, before determining that the packet will not reach the radio unit, preparing transmissions to at least one further UE including the second UE. Then, sending at least one further packet to the radio unit to cause the radio unit to send transmissions to the second UE in at least part of the time interval may comprise selecting the prepared transmissions to the second UE. This may for example reduce the time needed to prepare the transmissions to the second UE, and hence may allow a longer period for transmissions to the second UE. For example, this may allow greater utilization of the portion 306 of the time period for transmissions to the second UE.

In some examples, the method 200 may comprise, after determining that the packet will not reach the radio unit, causing the radio unit to send a notification to the first UE that there will be no transmissions to the first UE in the at least a portion of the time interval. Informing the first UE in this manner (e.g. using downlink control information, DCI) may allow the UE to take certain actions. For example, the UE may decide that transmissions to the first UE in the time interval 304 preceding the portion 306 may have been successfully received, and these transmissions received by the first UE may be stored by the first UE (e.g. in a soft buffer). This may in some examples aid in reception of a later retransmission of data that would have been sent to the first UE during the time interval 304, as at least part of the retransmission may be combined with the stored earlier transmissions.

Figure 4:
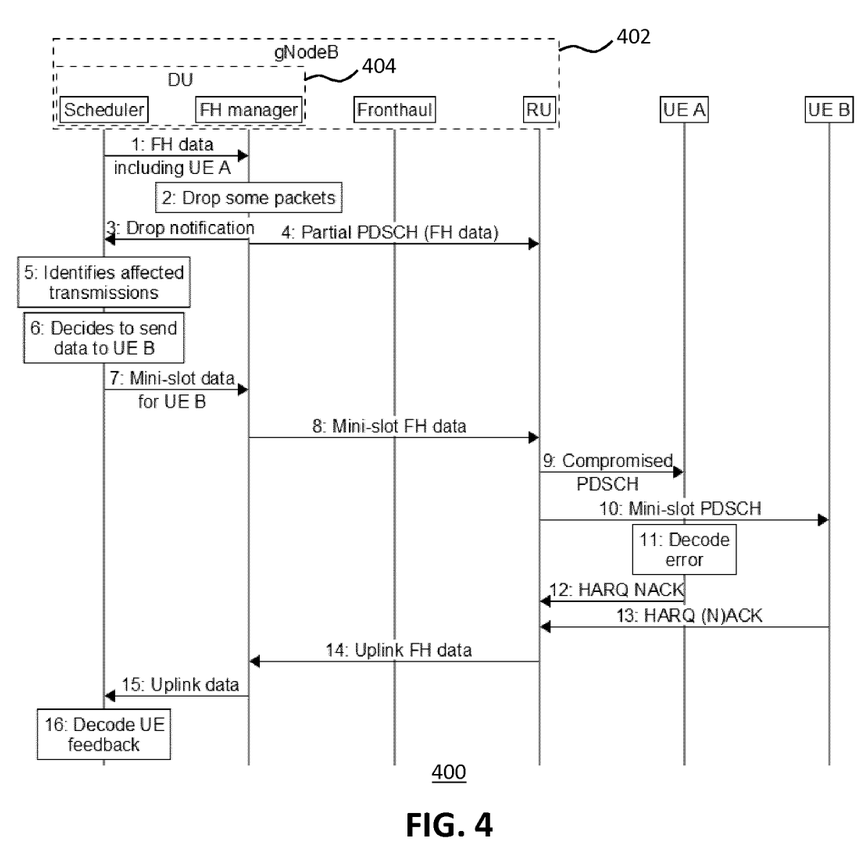
FIG. 4 shows an example of communications in a network.

FIG. 4 shows an example of communications in a network 400, for example during a particular example implementation of a method of sending data using a packet-based interface to cause a radio unit to send transmissions to at least one UE. The network includes a gNodeB 402 that may be a distributed gNodeB. The gNodeB comprises a digital unit (DU) 404 that includes a scheduler and a fronthaul (FH) manager. The gNodeB 400 also includes a fronthaul (e.g fronthaul interface) and a radio unit (RU). The network 400 also includes a first UE (UE A) and a second UE (UE B). A method may include the following method steps, which correspond to steps and communications shown in FIG. 4.

1. The scheduler sends fronthaul (FH) data to the FH manager, including data to cause the RU to send transmissions to UE A in at least a portion of a time interval allocated to the first UE for transmissions to the first UE. The transmissions may for example correspond to a PDSCH transmission to UE A
2. The fronthaul manager drops one or more of the packets of data.
3. The fronthaul manager informs the scheduler that the one or more packets have been dropped. For example, the fronthaul manager may identify the resource blocks or packets, or may identify the affected transmissions in some other manner.
4. The fronthaul manager may forward the remaining packets of data, now corresponding to a partial PDSCH transmission.
5. The scheduler identifies the transmissions that were affected by the packet drop(s).
6. The scheduler decides to send data to UE B in at least part of the time interval.
7. The scheduler sends mini-slot data (i.e. data for causing the RU to send transmissions to UE B in at least part of the time interval) to the FH manager.
8. The FH manager forwards the mini-slot FH data to the RU via the fronthaul network.
9. The RU transmits the compromised PDSCH (i.e. partial PDSCH) to UE A.
10. The RU transmits the mini-slot data, which may for example correspond to a PDSCH transmission, to UE B.
11. UE A encounters a decode error, as it has not received a complete PDSCH.
12. UE A sends a HARQ NACK to the RU.
13. UE B sends a HARQ ACK or NACK to the RU, depending on whether it has successfully received the mini-slot PDSCH.

14. The RU sends uplink FH data, including the HARQ responses from UE A and UE B, to the FH manager via the fronthaul network.
15. The FH manager sends the uplink FH data to the scheduler.
16. The scheduler decodes the HARQ feedback from the UEs.

In some examples, the New Radio (NR) preemption indicator (for example using DCI format 2-1, as defined in 3GPP TS 38.212 7.3.1.3.2, release 15.5.0, 2019-05) can be used to inform the affected UE(s) what part of their PDSCH is compromised by the FH packet drop. This may help mitigate efficiency loss, since the UE(s) can flush only that part of the soft buffer that corresponds to parts of the PDSCH that were not transmitted, and the unaffected regions of the PDSCH might still be decoded correctly, increasing the chance that a single retransmission (incremental redundancy) will be sufficient for successful reception and decoding of the whole PDSCH.

In some examples, to mitigate the air interface efficiency loss, the scheduler can assign at least some of the affected resource blocks (e.g. those reserved or allocated to the first UE for the portion of the time interval) to one or more other UEs (e.g. step 6 in FIG. 4). That is, for example, a large block of resource blocks could be interrupted and substituted by a smaller number of resource blocks in order to respect fronthaul limitations, even prior to most of the traffic leaving the baseband. In NR, for example, this could be done with downlink preemption and in some examples a "mini-slot" (e.g. PDSCH Type B transmission, as illustrated in 3GPP TS 38.214 5.1.2.1). In this non-limiting example, only UE B is selected for this reduced size transmission e.g. reduced size PDSCH. This decision and subsequent transport of the relevant PDSCH data for UE B (e.g. steps 6-8 in FIG. 4) may in some examples be sufficiently fast to allow transmission by the radio unit before the initially scheduled PDSCH for UE A is over. There may be a tradeoff between how much time the FH manager takes to respond and how much resources can be reused. In some examples, the FH manager is in the same hardware node as the FH traffic source, e.g. scheduler (this may be the case, for example, when high performance computing platforms are used to implement virtualized baseband processing units).

To avoid costly searches in limited time, the scheduler (e.g. digital unit, etc) can keep a table of opportunistic transmissions, ranked by e.g. mini-slot (or part of the time interval) size/duration, such that when a drop notification arrives and the scheduler identifies that UE A's transmission will be affected, it could quickly select which opportunistic transmission fits the remainder of this compromised PDSCH for UE A. This "overbooking" of RBs can be used for example for expediency of the scheduling, meaning that the scheduler can react quickly to the drop notification.

In the case of virtualized applications mentioned above, the concept of "drops" may in some examples be extended to cover also the erasing of PDUs from a shared memory region used by the NIC (Network Interface Controller) to store packets prior to transmission, for example where the NIC is shared by multiple virtualized nodes in the same hardware node. It is entirely possible that packets carrying data for a certain user are identified in some examples. That is, there is a mapping between a transmission to a certain UE and the packets it occupies in fronthaul. This mapping might exist as a header field, or any other type of implementation-dependent indicator and can be used to drop on a "decision" basis instead of a packet basis.

In some examples, FH managers may not be within the same hardware node as a traffic source (scheduler, digital unit etc) but instead in an immediately adjacent switch, and hence may also be co-located with the traffic source, for example in the same hardware cabinet or at the same location or premises. Additionally or alternatively, in some examples, fronthaul traffic could be encrypted using e.g. MACsec. In this case, there can be no reliance on the actual contents of the packets, since the payload would not be visible to the FH manager. Instead, a notification from the FH manager may allow the scheduler to identify which flow has been compromised, and this can be done using for example a sequence number, MACsec packet number, timestamp or frame check sequence (plus a table lookup), which MACsec does not obscure.

Even though at least some of the data for UE A will never reach the RU due to one or more dropped packets, the RU effectively transmits a compromised PDSCH that UE A might not be able to fully decode (e.g. steps 9 and 11 in FIG. 4). UE A is then likely in some examples to transmit a HARQ NACK corresponding to at least some of the time interval reserved for the PDSCH transmissions. In some examples, the scheduler can simply ignore the NACK from UE A (e.g. steps 12 and 16 in FIG. 4). Alternatively, the scheduler may use the knowledge that a NACK is expected from UE A to aid in decoding (step 16 in FIG. 4) the corresponding PUCCH (or PUSCH when the feedback is multiplexed with data). Additionally or alternatively, in some examples, the feedback (ACK/NACKs) of UE B could be multiplexed with the feedback of A in PUCCH.

In examples disclosed herein, the scheduler is used as the traffic source and the PDSCH is the transmissions to UEs A and B. However, other types of transmissions and/or other traffic sources may be used.

Figure 5:
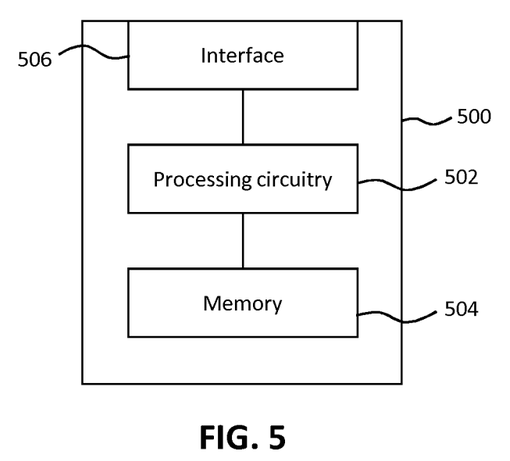
FIG. 5 is a schematic of an example of apparatus 500 for sending data using a packet-based interface to cause a radio unit to send transmissions to at least one UE.

FIG. 5 is a schematic of an example of apparatus 500 for sending data using a packet-based interface to cause a radio unit to send transmissions to at least one UE. The apparatus 500 comprises processing circuitry 502 (e.g. one or more processors) and a memory 504 in communication with the processing circuitry 502. The memory 504 contains instructions executable by the processing circuitry 502. The apparatus 500 also comprises an interface 506 in communication with the processing circuitry 502. Although the interface 506, processing circuitry 502 and memory 504 are shown connected in series, these may alternatively be interconnected in any other way, for example via a bus.

In one embodiment, the memory 504 contains instructions executable by the processing circuitry 502 such that the apparatus 500 is operable to determine that a packet for causing the radio unit to send transmissions to a first user equipment, UE, in at least a portion of a time interval allocated to the first UE for transmissions to the first UE will not reach the radio unit, and send at least one further packet to the radio unit to cause the radio unit to send transmissions to a second UE in at least part of the time interval. In some examples, the apparatus 500 is operable to carry out the method 200 described above, or the method described above with reference to FIG. 4.

One embodiment of a network implementing the solution disclosed in this document is illustrated in FIG. 1. 45. The network, 100, comprises an apparatus, 500, for sending data using a packet-based interface to cause a radio unit to send transmissions to at least one UE. The apparatus may be in one embodiment a baseband processing unit, 102 (also called digital units, DUs). The apparatus comprises a processor, 502, and a memory, 504, the memory containing instructions executable by the processor such that the apparatus is operable to determine, 202, that a packet for causing the radio unit to send transmissions to a first user equipment, UE, in at least a portion, 306, of a time interval, 304, allocated to the first UE for transmissions to the first UE will not reach the radio unit. When executing the instructions, the apparatus, 500, is further operative to send at least one further packet to the radio unit to cause the radio unit to send transmissions to a second UE in at least part, 308, 310, of the time interval, 304. The network, 100, with DUs, 102-108, is configured to operate in accordance with embodiments of the method described above.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of sending data using a packet-based interface to cause a radio unit to send transmissions to at least one user equipment (UE), the method comprising:
    determining that a packet for causing the radio unit to send transmissions to a first UE in at least a portion of a time interval allocated to the first UE for transmissions to the first UE will not reach the radio unit, the determination comprising receiving a notification from a switch of the packet-based interface that the packet will not reach the radio unit, the notification identifying at least one of the packet and the at least a portion of the time interval;
    in response to the determining:
        sending, by a scheduler, fronthaul (FH) data to an FH manager, the FH data including data to cause the radio unit to send transmissions to the first UE in at least a portion of the time interval allocated to the first UE for transmissions to the first UE;
        dropping, by the FH manager, one or more packets of data;
        informing the scheduler, by the FH manager, that the one or more packets of data have been dropped;
        forwarding, by the FH manager, one or more packets of data that have not been dropped, the packets of data that have not been dropped corresponding to a partial PDSCH transmission;
        identifying, by the scheduler, transmissions that were affected by the dropping of the one or more packets of data that were dropped;
        deciding, by the scheduler, to send data to a second UE in at least part of the time interval;
        sending, by the scheduler, mini-slot data to the FH manager;
        forwarding, by the FH manager, the mini-slot data to the radio unit via a fronthaul network;
        transmitting, by the radio unit, the partial PDSCH to the first UE;
        transmitting, by the radio unit, the mini-slot data to the second UE;
        receiving, by the radio unit, a HARQ NACK from the first UE;
        receiving, by the radio unit from the second UE, one of a HARQ ACK and a HARQ NACK based on whether the second UE successfully received the mini-slot data;
        sending, by the radio unit, uplink FH data to the FH manager via the fronthaul network, the uplink FH data comprising the HARQ NACK from the first UE and the one of the HARQ ACK and the HARQ NACK from the second UE;
        sending, by the FH manager, the uplink FH data to the scheduler; and
        decoding, by the scheduler, the uplink FH data; and
    sending at least one further packet to the radio unit to cause the radio unit to send transmissions to a second UE in at least part of the time interval.

2. The method of claim 1, wherein sending the at least one further packet to the radio unit to cause the radio unit to send transmissions to the second UE in the at least part of the time interval comprises sending the at least one further packet to the radio unit using the packet-based interface.

3. The method of claim 1, wherein the notification identifies the packet using at least one of a sequence number, MACsec packet number, time stamp and frame check sequence.

4. The method of claim 1, wherein the method is performed by one of a baseband processing unit, baseband processing network function, radio equipment controller, eCPRI radio equipment controller, distributed unit and digital unit.

5. The method of claim 1, wherein determining that the packet will not reach the radio unit comprises determining that the packet has been or will be dropped.

6. The method of claim 1, wherein the at least part of the time interval comprises at least part of the time interval following a start of the at least a portion of the time interval.

7. The method of claim 1, comprising receiving one of a hybrid automatic repeat request acknowledgement, HARQ ACK, and a negative acknowledgement, NACK, associated with the at least part of the time interval from the second UE and a HARQ NACK associated with the at least a portion of the time interval from the first UE.

8. The method of claim 1, comprising sending data using the packet-based interface to cause at least one further radio unit to send transmissions to at least one additional UE.

9. A non-transitory computer storage medium having stored thereon a computer program comprising instructions which, when executed on at least one processor, cause the at least one processor to carry out a method of sending data using a packet-based interface to cause a radio unit to send transmissions to at least one user equipment (UE), the method comprising:
    determining that a packet for causing the radio unit to send transmissions to a first UE in at least a portion of a time interval allocated to the first UE for transmissions to the first UE will not reach the radio unit, the determination comprising receiving a notification from a switch of the packet-based interface that the packet will not reach the radio unit, the notification identifying at least one of the packet and the at least a portion of the time interval;
    in response to the determining:
        sending, by a scheduler, fronthaul (FH) data to an FH manager, the FH data including data to cause the radio unit to send transmissions to the first UE in at least a portion of the time interval allocated to the first UE for transmissions to the first UE;

dropping, by the FH manager, one or more packets of data;

informing the scheduler, by the FH manager, that the one or more packets of data have been dropped;

forwarding, by the FH manager, one or more packets of data that have not been dropped, the packets of data that have not been dropped corresponding to a partial PDSCH transmission;

identifying, by the scheduler, transmissions that were affected by the dropping of the one or more packets of data that were dropped;

deciding, by the scheduler, to send data to a second UE in at least part of the time interval;

sending, by the scheduler, mini-slot data to the FH manager;

forwarding, by the FH manager, the mini-slot data to the radio unit via a fronthaul network;

transmitting, by the radio unit, the partial PDSCH to the first UE;

transmitting, by the radio unit, the mini-slot data to the second UE;

receiving, by the radio unit, a HARQ NACK from the first UE;

receiving, by the radio unit from the second UE, one of a HARQ ACK and a HARQ NACK based on whether the second UE successfully received the mini-slot data;

sending, by the radio unit, uplink FH data to the FH manager via the fronthaul network, the uplink FH data comprising the HARQ NACK from the first UE and the one of the HARQ ACK and the HARQ NACK from the second UE;

sending, by the FH manager, the uplink FH data to the scheduler; and decoding, by the scheduler, the uplink FH data; and sending at least one further packet to the radio unit to cause the radio unit to send transmissions to a second UE in at least part of the time interval.

10. An apparatus for sending data using a packet-based interface to cause a radio unit to send transmissions to at least one user equipment (UE), the apparatus comprising a processor and a memory, the memory containing instructions executable by the processor such that the apparatus is configured to:

determine that a packet for causing the radio unit to send transmissions to a first UE in at least a portion of a time interval allocated to the first UE for transmissions to the first UE will not reach the radio unit, the determination comprising receiving a notification from a switch of the packet-based interface that the packet will not reach the radio unit, the notification identifying at least one of the packet and the at least a portion of the time interval;

in response to the determining:

sending, by a scheduler, fronthaul (FH) data to an FH manager, the FH data including data to cause the radio unit to send transmissions to the first UE in at least a portion of the time interval allocated to the first UE for transmissions to the first UE;

dropping, by the FH manager, one or more packets of data;

informing the scheduler, by the FH manager, that the one or more packets of data have been dropped;

forwarding, by the FH manager, one or more packets of data that have not been dropped, the packets of data that have not been dropped corresponding to a partial PDSCH transmission;

identifying, by the scheduler, transmissions that were affected by the dropping of the one or more packets of data that were dropped;

deciding, by the scheduler, to send data to a second UE in at least part of the time interval;

sending, by the scheduler, mini-slot data to the FH manager;

forwarding, by the FH manager, the mini-slot data to the radio unit via a fronthaul network;

transmitting, by the radio unit, the partial PDSCH to the first UE;

transmitting, by the radio unit, the mini-slot data to the second UE;

receiving, by the radio unit, a HARQ NACK from the first UE;

receiving, by the radio unit from the second UE, one of a HARQ ACK and a HARQ NACK based on whether the second UE successfully received the mini-slot data;

sending, by the radio unit, uplink FH data to the FH manager via the fronthaul network, the uplink FH data comprising the HARQ NACK from the first UE and the one of the HARQ ACK and the HARQ NACK from the second UE;

sending, by the FH manager, the uplink FH data to the scheduler; and decoding, by the scheduler, the uplink FH data; and send at least one further packet to the radio unit to cause the radio unit to send transmissions to a second UE in at least part of the time interval.

11. The apparatus of claim 10, wherein the memory contains instructions executable by the processor such that the apparatus is configured to send the at least one further packet to the radio unit to cause the radio unit to send transmissions to the second UE in the at least part of the time interval by sending the at least one further packet to the radio unit using the packet-based interface.

12. The apparatus of claim 10, wherein the switch is co-located with the apparatus.

13. The apparatus of claim 10, wherein the memory contains instructions executable by the processor such that the apparatus is configured to determine that the packet will not reach the radio unit by determining that the packet has been or will be dropped.

14. The apparatus of claim 10, wherein the memory contains instructions executable by the processor such that the apparatus is configured to send the at least one further packet to the radio unit to cause the radio unit to send transmissions to the second UE in at least part of the time interval by sending the at least one further packet to the radio unit to cause the radio unit to send transmissions to the second UE in at least a sub-portion of the portion of the time interval.

15. The apparatus of claim 10, wherein the at least part of the time interval comprises at least part of the time interval following a start of the at least a portion of the time interval.

16. The apparatus of claim 10, wherein the memory contains instructions executable by the processor such that the apparatus is configured to receive one of a hybrid automatic repeat request acknowledgement, HARQ ACK, and a negative acknowledgement, NACK, associated with the at least part of the time interval from the second UE and a HARQ NACK associated with the at least a portion of the time interval from the first UE.

17. The apparatus of claim 10, wherein the memory contains instructions executable by the processor such that the apparatus is configured to send data using the packet-based interface to cause at least one further radio unit to send transmissions to at least one additional UE.

18. The apparatus of claim 10, wherein the memory contains instructions executable by the processor such that the apparatus is configured to, before determining that the packet will not reach the radio unit, prepare transmissions to at least one further UE including the second UE, and to send at least one further packet to the radio unit to cause the radio unit to send transmissions to the second UE in at least part of the time interval by selecting the prepared transmissions to the further UE.

19. A network comprising an apparatus for sending data using a packet-based interface to cause a radio unit to send transmissions to at least one user equipment (UE), the apparatus comprising a processor and a memory, the memory containing instructions executable by the processor such that the apparatus is configured to:
  determine that a packet for causing the radio unit to send transmissions to a first UE in at least a portion of a time interval allocated to the first UE for transmissions to the first UE will not reach the radio unit, the determination comprising receiving a notification from a switch of the packet-based interface that the packet will not reach the radio unit, the notification identifying at least one of the packet and the at least a portion of the time interval;
  in response to the determining:
    sending, by a scheduler, fronthaul (FH) data to an FH manager, the FH data including data to cause the radio unit to send transmissions to the first UE in at least a portion of the time interval allocated to the first UE for transmissions to the first UE;
    dropping, by the FH manager, one or more packets of data;
    informing the scheduler, by the FH manager, that the one or more packets of data have been dropped;
    forwarding, by the FH manager, one or more packets of data that have not been dropped, the packets of data that have not been dropped corresponding to a partial PDSCH transmission;
    identifying, by the scheduler, transmissions that were affected by the dropping of the one or more packets of data that were dropped;
    deciding, by the scheduler, to send data to a second UE in at least part of the time interval;
    sending, by the scheduler, mini-slot data to the FH manager;
    forwarding, by the FH manager, the mini-slot data to the radio unit via a fronthaul network;
    transmitting, by the radio unit, the partial PDSCH to the first UE;
    transmitting, by the radio unit, the mini-slot data to the second UE;
    receiving, by the radio unit, a HARQ NACK from the first UE;
    receiving, by the radio unit from the second UE, one of a HARQ ACK and a HARQ NACK based on whether the second UE successfully received the mini-slot data;
    sending, by the radio unit, uplink FH data to the FH manager via the fronthaul network, the uplink FH data comprising the HARQ NACK from the first UE and the one of the HARQ ACK and the HARQ NACK from the second UE;
    sending, by the FH manager, the uplink FH data to the scheduler; and
    decoding, by the scheduler, the uplink FH data; and
  send at least one further packet to the radio unit to cause the radio unit to send transmissions to a second UE in at least part of the time interval.

* * * * *